United States Patent [19]
Harnish

[11] Patent Number: 5,996,367
[45] Date of Patent: Dec. 7, 1999

[54] HEAT PUMP AND AIR CONDITIONING SYSTEM COMPRESSOR UNLOADING METHOD AND APPARATUS

[75] Inventor: James R. Harnish, York, Pa.

[73] Assignee: Gas Research Institute, Chicago, Ill.

[21] Appl. No.: 08/144,321

[22] Filed: Nov. 1, 1993

[51] Int. Cl.⁶ .................................................. F25B 49/00
[52] U.S. Cl. ........................................ 62/323.4; 417/295
[58] Field of Search .............................. 62/323.1, 323.3, 62/323.4, 324.1, 505; 417/295

[56] References Cited

U.S. PATENT DOCUMENTS

| | | | |
|---|---|---|---|
| 1,962,771 | 6/1934 | Hornaday | 417/295 |
| 2,178,100 | 10/1939 | Gygax | 417/295 |
| 2,186,320 | 1/1940 | Boldt | 417/295 |
| 2,388,210 | 10/1945 | Hanson et al. | 62/322.1 |
| 2,581,956 | 1/1952 | Jones | 62/323.1 |
| 2,962,873 | 12/1960 | Anderson | 62/323.3 |
| 2,988,263 | 6/1961 | Fogt | 417/295 |
| 3,041,849 | 7/1962 | Harnish | 62/215 |
| 3,104,801 | 9/1963 | Bancel | 417/298 |
| 3,117,425 | 1/1964 | Hartwell | 417/298 |
| 3,210,958 | 10/1965 | Coyne | 62/505 |
| 3,303,988 | 2/1967 | Weatherhead | 417/298 |
| 3,844,686 | 10/1974 | Le Blanc | 417/298 |
| 4,006,602 | 2/1977 | Fanberg | 62/113 |
| 4,137,726 | 2/1979 | Watada | 62/196 |
| 4,332,144 | 6/1982 | Shaw | 62/324.1 |
| 4,389,168 | 6/1983 | Yannascoli et al. | 417/298 |
| 4,584,844 | 4/1986 | Lemal | 62/160 |
| 4,688,391 | 8/1987 | Chopko et al. | 62/163 |
| 4,991,400 | 2/1991 | Wilkinson | 62/228.4 |
| 5,029,449 | 7/1991 | Wilkinson | 62/175 |

Primary Examiner—Henry A. Bennett
Assistant Examiner—William C. Doerrler
Attorney, Agent, or Firm—Dick and Harris

[57] ABSTRACT

A simplified combustion engine driven heat pump system having electric power co-generation capability includes a compressor unloading valve to reduce demand on the engine and optimize the efficiency of intermittent power generation during heat pump system downtime. Some benefits of electrical power generation available in more sophisticated system designs are thereby obtained with a smaller, simpler, inexpensive and reliable system.

17 Claims, 5 Drawing Sheets

HEAT PUMP AND AIR CONDITIONING SYSTEM COMPRESSOR UNLOADING METHOD AND APPARATUS

BACKGROUND OF THE INVENTION

The present invention relates to combustion engine driven heat pump systems and air conditioning systems which provide for the auxiliary generation of electrical power. In particular, it relates to those systems which generate auxiliary electrical power for system fans and pumps, for building power requirements, or for return to power system grids.

This invention is directed primarily to heat pump systems which are applied to heating and air conditioning loads of the environment in the living spaces of buildings. As used herein, the term air conditioning means the adjustment of the temperature and humidity in the living space to selected comfortable norms when the outside environment and particularly the ambient temperature, is either too high or too low for comfort. However, many of the objectives and concepts of this invention also have application to other types of thermal loads. Therefore, the term "load" as used herein, while specifically in the context of air conditioning, may be interpreted broadly to apply to other thermal loads by those familiar with heating and cooling technology.

In many heat pump systems, refrigerant vapor is compressed in rotating or reciprocating compressors. Where the compressor is driven by an internal combustion engine or other form of motive power, it has been proposed to further connect and drive an electrical generator with the engine to produce auxiliary power.

The co-generation of electrical power in heat pump systems presents various problems, including the maintenance of constant electrical output, typically 60 cycle alternating current. To produce 60 cycle alternating current power, it is typically necessary that the generator be operated at substantially constant speed. Because of the wide range of temperature and load conditions to which the heat pump system responds, the demand on the combustion engine will vary dramatically with the compressor load. Consequently, engine throttle and speed are important factors which must be controlled to achieve both proper heat pump system operation and proper electrical generation.

U.S. Pat. No. 4,991,400 to Wilkinson discloses an apparatus providing for interconnection and cooperation between the various heat pump and electrical generation components of the system which provides for more optimal, and continuous operation of both the heat pump and electrical generation systems. In the '400 patent, Wilkinson teaches the use of a continuously variable transmission (CVT) to continuously vary, increasing or decreasing, the ratio of speed between the combustion engine and the electrical generator. A planetary gear is further positioned at the compressor in cooperation, the CVT to further increase or decrease the speed and torque transmitted to the compressor.

While the CVT is capable of providing continuous, generally constant operation of the electrical generator and continuous operation of the compressor, these components can add considerable cost to the overall heat pump/power generation system. Moreover, the added complexity increases the maintenance requirements of the heat pump system, such as the need to maintain the belts of belt-driven CVTs. The continuous production of electrical power, while desirable, has the undesirable effect, particularly in extreme temperature conditions, of requiring additional loading of the combustion engine at times when it already experiences high loads at the compressor. Moreover, despite the use of the CVT and planetary gear, the compressor typically continues to provide some load to the combustion engine at all times, reducing the overall efficiency of the system.

Accordingly the need remains for additional, cost-effective, reliable heat pump systems providing electrical co-generation, without the disadvantages of existing systems.

SUMMARY OF THE INVENTION

The present invention satisfies that need by providing a simplified system providing intermittent electrical generation during heat pump system downtime. Expensive CVT and planetary gear components may be eliminated, and maintenance costs thereby reduced. In accordance with the present invention, the heat pump system includes an unloading valve to permit compressor unloading and to reduce demand on the engine, thereby optimizing the efficiency of intermittent power generation. Because the compressor and power generation demands are not continuously added, the present invention allows the use of a smaller combustion engine to drive system components. Accordingly, the present invention permits some benefits of electrical power generation available in more sophisticated system designs, to be obtained with a smaller, simpler, inexpensive and reliable system.

In the preferred embodiment, the present invention is a motive drive system for a heating and cooling apparatus having a vapor compressor and an electric generator. The system includes an internal combustion engine in direct, rotating driving connection to both the vapor compressor and electric generator. Means for unloading the vapor compressor during electric power generation include an unloading valve which is positionable to block the vapor flow into the compressor. Several arrangements for the unloading valve are contemplated, including, in one embodiment, the integration of the valve into the compressor structure. When the compressor is unloaded, the engine operates to produce at least one rotational speed at the driving connection and provide substantially constant rotative speed and electrical frequency output of the generator.

The system is primarily designed to provide intermittent power generation with the advantages set forth above. In addition, where power generated is not used immediately, connection back into the power grid provides the opportunity for cost recovery, where payment for generated power added into the power grid is mandated by law, or otherwise permitted by utilities. Further, while the frequency of the power output is substantially constant, it may further be desirable to modify the output to establish a more precise output, smooth out variations, or change the frequency. Such means for modifying the output, in cooperation with the means for unloading the compressor for power generation, may be further used cooperatively where continuous power generation is desired. However, intermittent power generation is preferred in accordance with the present invention.

Regardless, when the compressor is unloaded, friction heat in the compressor can increase. While the compressor is capable of rejecting the friction heat to the ambient atmosphere by radiation, in some applications, such as high ambient temperature conditions, it may remain desirable to provide additional cooling. In a further aspect of the present invention, a liquid injection line is provided which can draw liquid vapor from the cooling and heat pumping subsystem, and inject it at a desired rate into the compressor for cooling. A residual of such liquified vapor is typically available in the system shortly after unloading the compressor to shut down the cooling and heat pumping subsystem.

Accordingly, it is an object of the present invention to provide a simplified system in which intermittent electrical generation may be achieved with high efficiency during heat pump system downtime by unloading the compressor and thereby reducing the engine load.

It is a further object of the present invention to eliminate the initial cost and maintenance expense related to CVT and planetary gear components.

It is a further object of the present invention to provide for electrical power generation and cooling and heat pumping needs with a small, compact, simple, inexpensive and reliable engine, compressor and generator design.

It is a further object of the present invention to provide an apparatus which provides an economically desirable compromise between the cost and sophistication required for continuous electrical generation, and the reliability of less complex systems useful for intermittent electrical generation.

These and further objects and advantages of the present invention will become apparent from the foregoing, and in the following description of the drawings and detailed description of the preferred embodiment. It is contemplated that variations in the procedure, structural features and arrangement of parts may appear to those skilled in the art without departing from the scope or sacrificing any of the advantages of the invention.

DETAILED DESCRIPTION OF THE PREFERRED EMBODIMENTS

Figure 1:
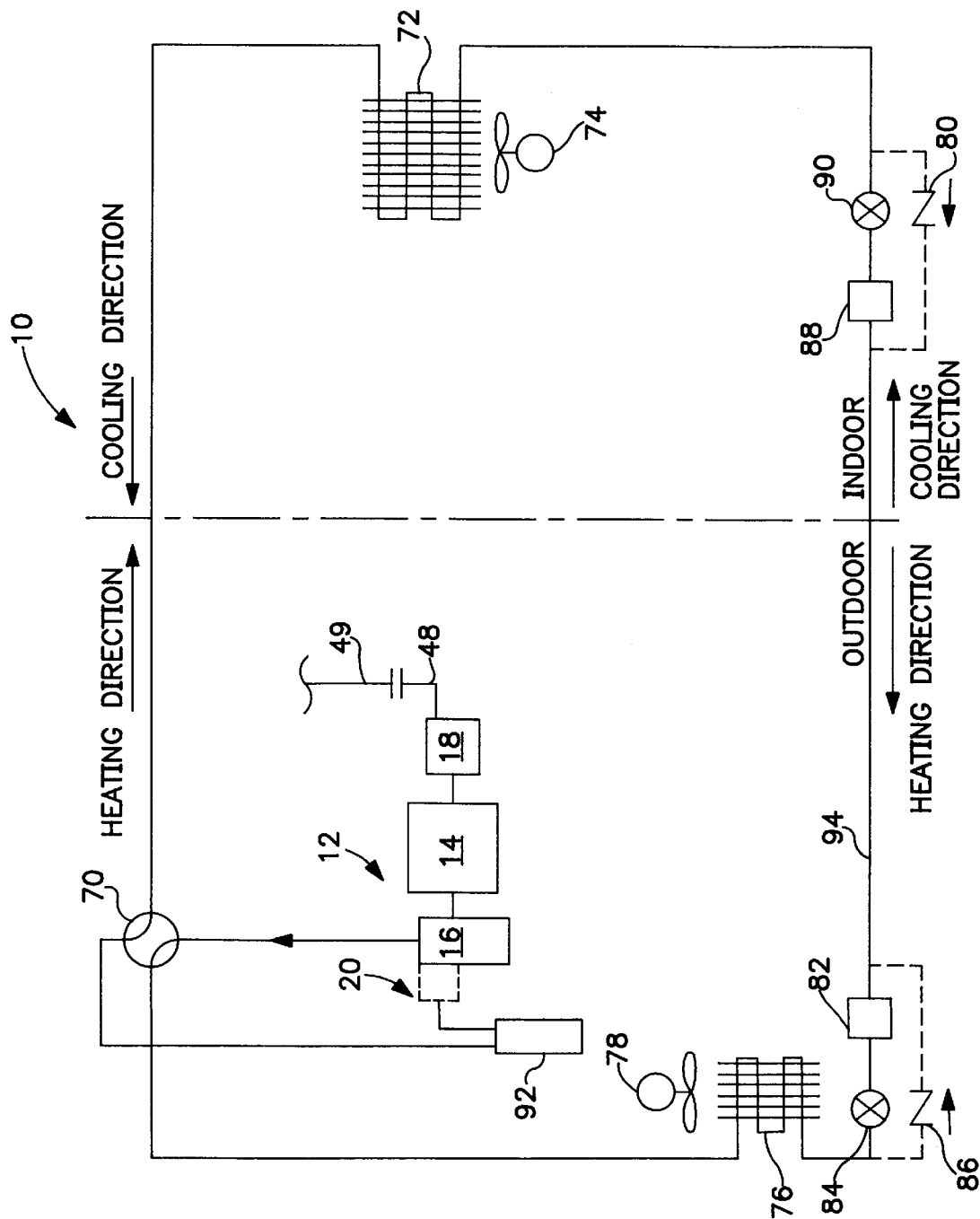
FIG. 1 is a schematic diagram of a heat pump system incorporating means for unloading the compressor and a generator for electrical power generation in accordance with the present invention.

Referring to FIG. 1, a motive drive system 12 in accordance with the present invention is shown in a heat pump system 10, including an internal combustion engine 14 in rotating driving connection to a vapor compressor 16 and in rotating driving connection to an electric generator 18. Means 20 for unloading the vapor compressor 16 during power generation are enclosed by a dashed line, and reduce the demand imposed by the compressor 16 upon the engine 14. The means 20 for unloading include an unloading valve 22 positionable to block vapor flow into the compressor 16, and a sump equalizer 24, 44, as shown in detail in FIGS. 2A–3B. The engine 14 operates when the compressor 16 is unloaded to produce at least one rotational speed of the driving connection and provide substantially constant rotative speed and electrical frequency output of the generator 18.

Illustratively shown in FIG. 1, heat pump system components include a reversing valve 70 which is positionable to direct compressor output in one of two directions for either heating or cooling (as shown) indoor living space. Indoor and outdoor heat exchangers 72, 76 are shown with their associated blowers or fans 74, 78. Check valve 80, filter dryer 82 and expansion valve 84 are included for liquid flowing in the heating direction, while check valve 86, filter dryer 88 and expansion valve 90 are shown for liquid flowing in the cooling direction. An accumulator 92 near the compressor suction is further illustratively shown. The accumulator 92 and filter dryers 82, 88 are not essential to the operation of the heat pump system 10. Engine coolant circuits are not shown for clarity.

Figure 2A:
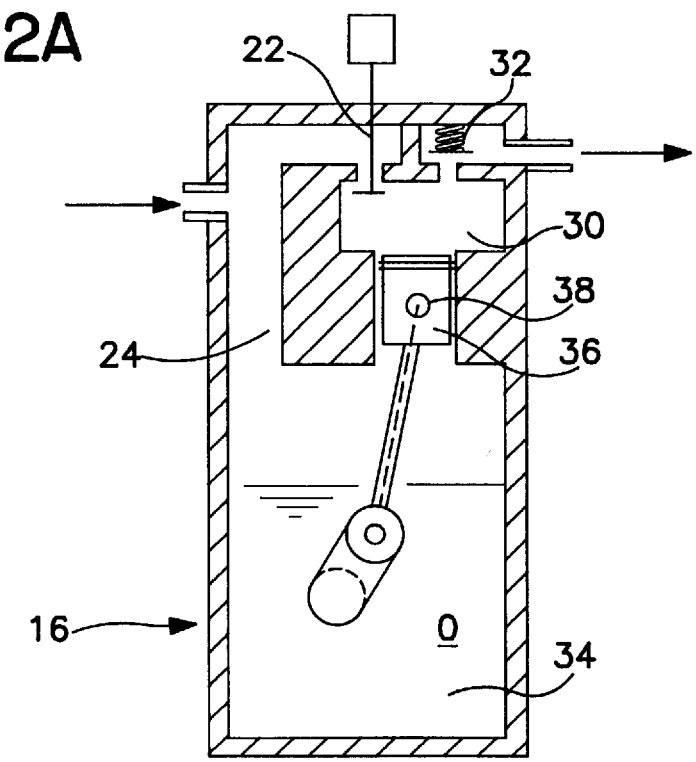
FIG. 2A is a schematic cross-sectional view of a compressor incorporating an unloading valve in the suction inlet port of a compressor cylinder in accordance with the present invention.

Referring to FIGS. 2A–3B, the compressor 16 comprises of compressor parts including a compression chamber or cylinder 30, having a discharge valve 32. The unloading valve 22 is disposed upstream from the cylinder 30, and is preferably a solenoid valve, but may be operable by other suitable means. As shown in FIG. 2A, unloading valve 22 is operable between at least a first, open position (shown), wherein vapor flows freely therethrough into the cylinder 30, and a second, closed position, not shown, wherein vapor flow to the cylinder 30 is blocked to unload the compressor 16. As further illustrated, the compressor 16 includes a crankcase sump 34 having oil O for lubricating compressor parts, and the means 20 for unloading further comprises a passage 24 connecting the crankcase sump 34 to a point upstream of the unloading valve 22 which causes the pressure in the crankcase sump 30 to equalize with the vapor pressure upstream from the unloading valve 22.

The passage 24 is necessary to avoid damage to the compressor 16 during operation while unloaded. Blocking the vapor flow to the compressor 16 causes the compressor to operate at very high compression ratios (e.g. 20 to 1). The re-expanding gas in the cylinder 30 provides a continuous downward pressure on the piston 36 and wrist pin 38 upper bearing surface, which inhibits the usual capillary flow of oil (shown in dashed line) up the piston rod to the wrist pin 38. Such capillary flow is typical in compressors of the type useful in heat pump systems. The absence of lubrication in the wrist pin 38 will eventually seize the bearing surface thereof. Equalizing the crankcase sump 34 to a higher pressure than what occurs inside the cylinder 30 permits the downward pressure to be opposed by the higher pressure on the underside of the piston 36, thereby improving lubrication of the wrist pin 38. Thus, when the unloading valve 22 is closed to unload the compressor 16, passage 24 allows the pressure in the crankcase sump 30 to generally equalize with the vapor pressure upstream from the unloading valve 22.

Figure 2B:
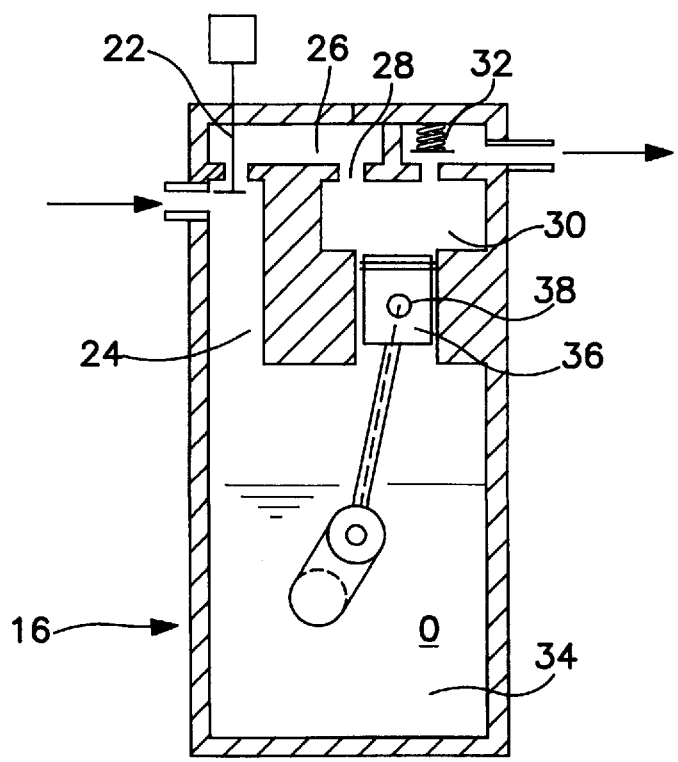
FIG. 2B is a schematic cross-sectional view of a compressor incorporating an unloading valve in the suction manifold of a compressor in accordance with the present invention.

FIG. 2B illustrates another configuration wherein the unloading valve 22 is integrated in the compressor 16 and is located to block the vapor flow into a suction manifold 26 which serves to convey vapor through suction ports 28 into one or multiple cylinders 30 of the compressor 16.

Figure 3A:
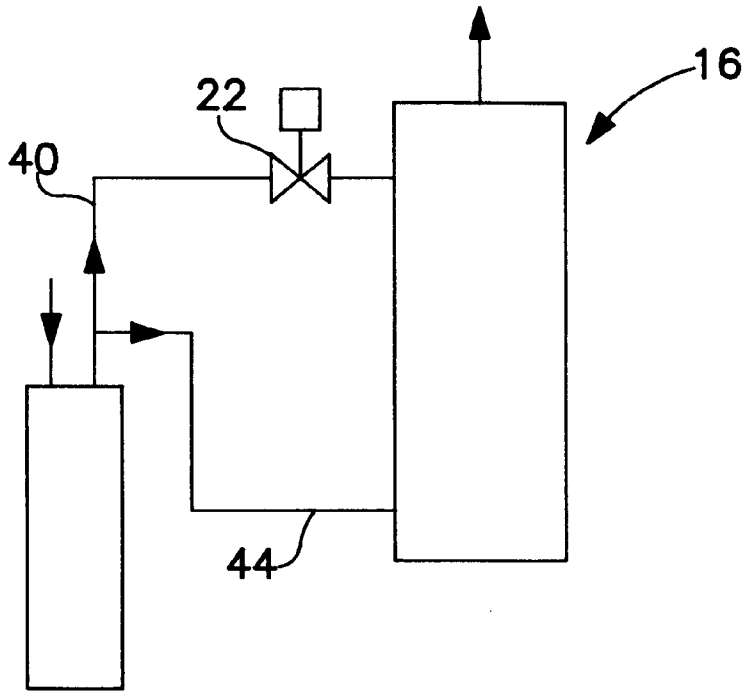
FIG. 3A is a schematic diagram of the compressor of FIG. 1 wherein the unloading valve and sump equalizer line are in external piping.
Figure 3B:
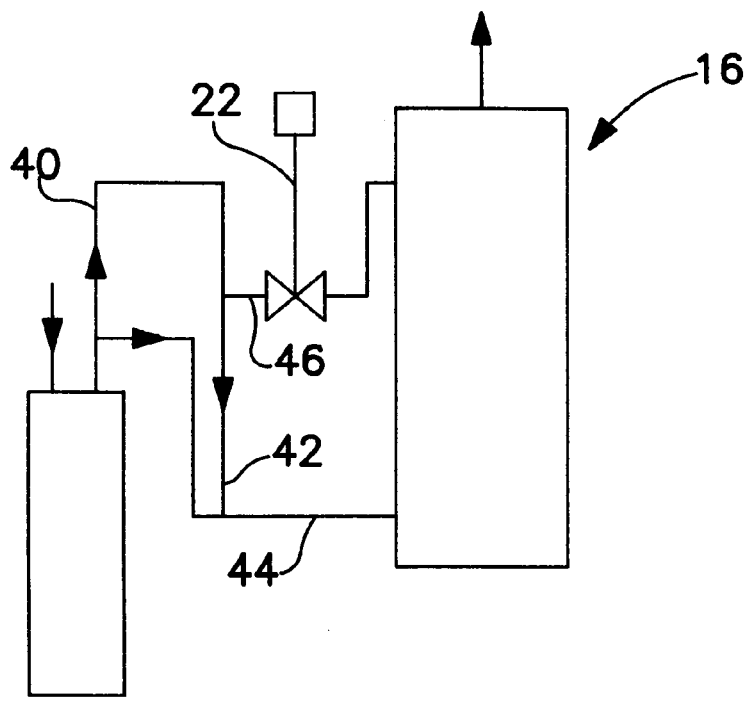
FIG. 3B is a schematic diagram of FIG. 3A arranged to include an oil by-pass line and oil separation loop.

Referring now to FIGS. 3A and 3B, in an alternative embodiment, the means 20 for unloading the compressor 16 is not integrated with, but is disposed outside the compressor 16. Unloading valve 22, again preferably a solenoid valve, is positioned in a vapor suction line 40 which extends to the compressor 16. In FIG. 3A, the passage 24 comprises a crankcase equalizer line 44 extending from a point upstream from the unloading valve 22 to the crankcase sump 34 to equalize the pressure with the vapor pressure upstream from the unloading valve 22.

As further shown in FIG. 3B, in the alternative embodiment it is preferred that the unloading valve 22 is positioned in a vapor suction line 40 which further includes an oil by-pass branch line 42 positioned at an oil separation loop or bend 46. The vapor follows the loop or bend 46 to the compressor suction, while the momentum of heavier oil droplets present in the vapor tends to drive them past the bend, causing them to separate from the vapor and flow straight into the branch line 42. The oil droplets then drain from branch line 42 through equalizer line 44 to the crankcase sump 34. Preferably, the branch line 42 is positioned, as schematically shown, to receive downward flow from the vapor suction line 40.

At times when no heating or cooling is required, when the engine 14 is operated to produce electric power, and the compressor 16 is unloaded, friction heat in the compressor can increase. Rather than being carried away in part in the vapor flow, friction heat in the compressor 16 tends to build up. While the compressor 16 is capable of rejecting the friction heat to the ambient atmosphere by radiation, in some applications, such as high ambient temperature conditions, it may remain desirable to provide additional cooling.

Figure 4:
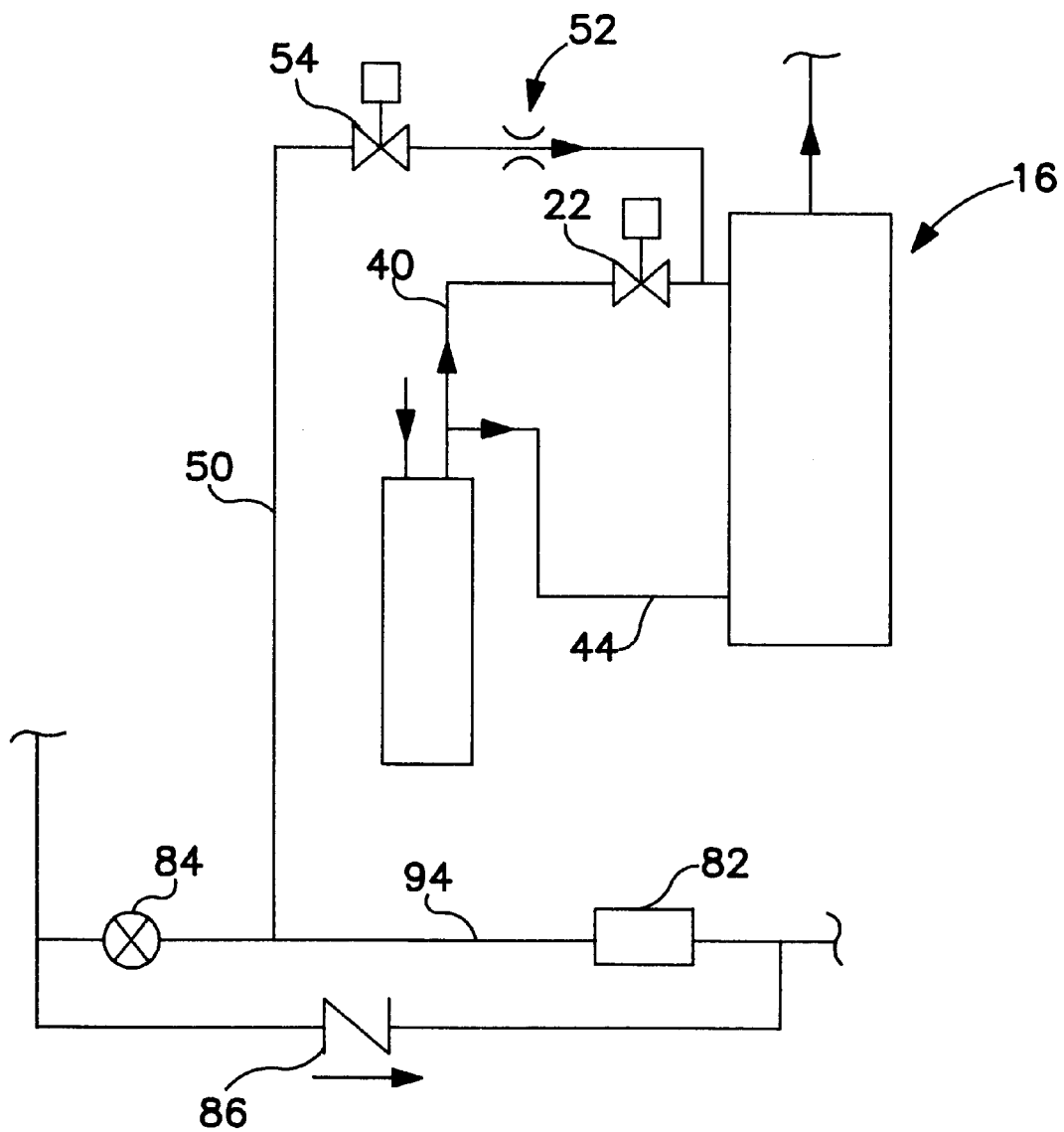
FIG. 4 is a schematic diagram of the liquid injection method for compressor cooling in accordance with the present invention.

Referring to FIG. 4, in a further aspect of the present invention, a liquid injection line 50 is provided which can draw liquid vapor from the heat pump system 10, meter it at a desired rate, and inject it into the compressor 16 downstream of the unloading valve 22 for compressor cooling. The point of injection may be in the compressor 16 itself, or in external piping as representatively illustrated in FIG. 4, depending on the structure and position of the unloading valve 22. A residual of such liquified vapor is typically condensed during heat pump operation, available in the liquid line 94 of the system 10 shortly after unloading the compressor 16 (see also FIG. 1). A means 52 for metering liquid through the liquid injection line 50 provides control over the flow of liquid and cooling provided. The means 52 for metering indicated generally in FIG. 4, may be capillary tube, an orifice (as representatively shown), or an expansion valve. A shut-off valve 54, such as a solenoid valve, is further provided to stop the flow of liquid vapor when the compressor 16 is again loaded and the cooling and heat pumping system 10 is operated to provide heating or cooling.

The system 12 of the present invention is primarily designed to provide intermittent power generation with the advantages of size, simplicity, cost and reliability. As further shown in FIG. 1, where the power generated is not used immediately, the power can be returned to the electric power grid 49 which supplies power to fans 74, 78 and pumps (not shown) in the system 10 at other times through a return electrical connection 48 extending from the output side of the generator 18 to the power grid 49. As such, the present invention provides users with the opportunity for cost recovery, where payment for generated power returned to a power grid 49 is mandated by law, or otherwise accepted by utilities. Where generator power output is not desired, the electrical connection 48 can be disconnected from power grid 49.

Figure 5A:
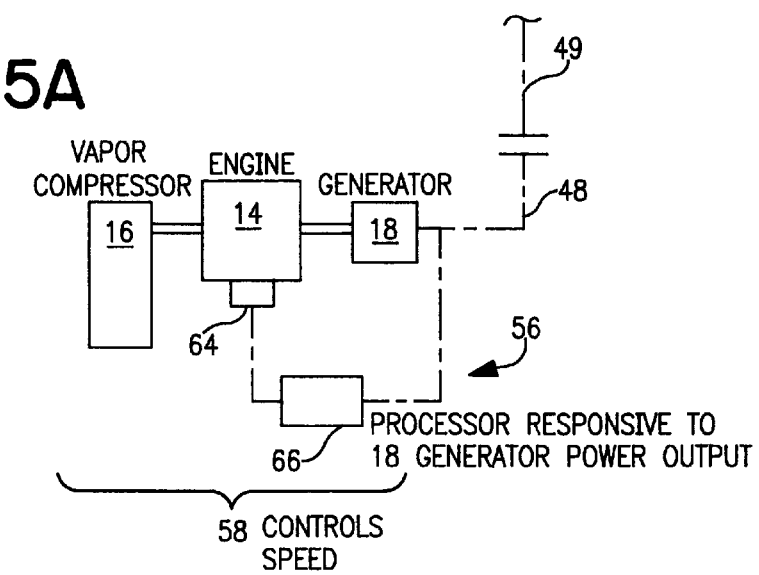
FIGS. 5A–5C are schematic diagrams illustratively showing alternative means for modifying the generator output.
Figure 5B:
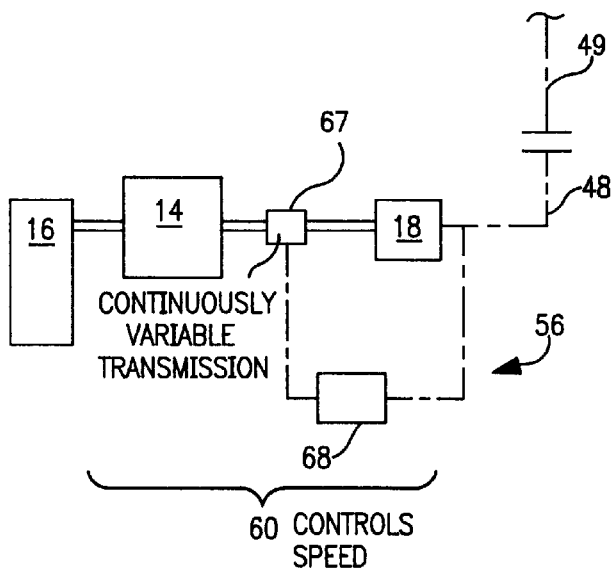
Figure 5C:
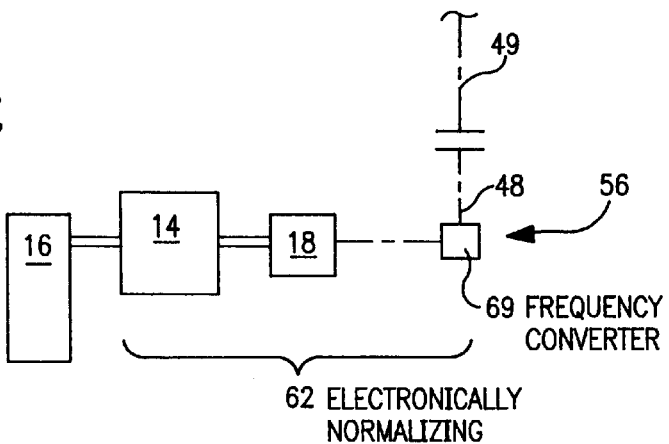

It is preferred for simplicity that when the compressor is unloaded, the engine 14 operates so that the generator 18 produces substantially constant electrical frequency power output. However, as shown in FIGS. 5A–5C, the system 12 of the present invention may further include means 56 for modifying the frequency of power output from the generator 18. Means 56 for modifying the frequency of power output may be desirable to establish a more precise output, smooth out variations in output, or change the frequency of the output. The means 56 for modifying the frequency of power output may include: means 58 for controlling the rotative speed of the engine 14, such as a means 64, 66 for controlling the throttle and speed of the engine 14 in response to the generator power output (FIG. 5A); means 60 for controlling the speed at which the generator is driven, such as a continuously variable transmission 67 (FIG. 5B); means 62 for electronically normalizing the generator output, which includes a frequency converter 69, also known as a frequency changer or frequency translator (FIG. 5C); or combinations thereof.

Referring to FIG. 5A in greater detail, the means 58 for controlling the rotative speed of the engine 14 representatively includes an engine speed controller 64, and a processor means 66 which monitors the generator power output and adjusts the engine speed controller 64 in response thereto. Alternatively, a governor means (not shown) may be used to measure the speed of the generator driving connection and input same into the processor means 66, which then adjusts the engine speed controller 64 in response thereto. FIG. 5B further representatively shows the means 60 for controlling the speed at which the generator is driven, including a continuously variable transmission 67 connecting the engine 14 to the generator 18, such as a known belt-driven CVT. The CVT is operated by the processor means 69 in response to the generator power output, to vary the speed at which the generator 18 is driven and produce the desired output signal. Voltage converters (not shown) may also be used to further modify the output signal.

Such means 56 for modifying the output, in cooperation with the means 20 for unloading the compressor 16 for power generation, may be further used cooperatively to continuously produce substantially constant electrical frequency output of the generator 18, where continuous power generation is desired. However, such is not preferred.

While certain representative embodiments and details have been shown and described for purposes of illustrating the invention, it will be apparent to those skilled in the art that various changes in the apparatus and method disclosed herein may be made without departing from the scope of the invention which is defined in the appended claims.

What is claimed is:

1. A motive drive system for a heating and cooling apparatus having a vapor compressor having a compression member, and an electric generator, comprising:

an internal combustion engine power source in rotating driving connection to the vapor compressor and in rotating driving connection to the electric generator, and providing motive power for the system; and means for unloading the vapor compressor during power generation to reduce the load imposed by the compressor upon the engine, the means for unloading including an unloading valve positionable to block vapor flow into the compressor, the means for unloading further including means for supplying back pressure to the compression member, for facilitating operation of the compression member; and wherein the engine operates when the compressor is unloaded to produce at least one rotational speed of the driving connection and provide substantially constant rotative speed and electrical frequency output of the generator.

2. The system of claim 1 wherein:

the compressor comprises compressor parts including a compression chamber; and the unloading valve is disposed upstream from the compression chamber, and is operable between at least a first position wherein vapor flows freely therethrough into the compression chamber, and a second position wherein vapor flow to the compression chamber is blocked to unload the compressor.

3. The system of claim 2 wherein:

the compressor further comprises a crankcase sump having oil for lubricating compressor parts;

the means for supplying back pressure to the compression member further comprises a passage connecting the crankcase sump to a point upstream of the unloading valve;

whereby the pressure in the crankcase sump may generally equalize with the vapor pressure upstream from the unloading valve.

4. The system of claim 3 wherein the unloading valve is integrated with the compressor.

5. The system of claim 4 wherein the compressor includes a suction manifold conveying vapor to at least one compression chamber, and the unloading valve is positioned in the suction manifold.

6. The system of claim 3 wherein the unloading valve is disposed outside the compressor.

7. The system of claim 6 wherein the passage comprises a crankcase equalizer line extending from a point upstream from the unloading valve to the crankcase sump.

8. The system of claim 7 wherein the unloading valve is positioned in a vapor suction line which extends to the compressor, which suction line further includes an oil by-pass branch line positioned to receive oil droplets present in the vapor and convey them to the crankcase equalizer line.

9. The system of claim 1 further comprising means for modifying the frequency output from the generator.

10. The system of claim 9 wherein the means for modifying comprises a means for sensing the generator output and controlling the throttle and speed of the engine in response thereto to provide substantially constant rotative speed and electrical frequency output of the generator when the compressor is unloaded.

11. The system of claim 9 wherein the generator operates continuously to produce substantially constant electrical frequency output of the generator.

12. The system of claim 1 further comprising an electrical connection extending from the generator output for connection to an electric power supply grid.

13. The system of claim 1 wherein the compressor is operatively connected to a cooling and heat pumping subsystem having a liquid line wherein the vapor may be condensed, and further comprising:

a liquid injection line connected at its first end to the liquid line and at its second end to a point downstream of the unloading valve, and a means for metering liquid through the liquid injection line to provide cooling to the compressor when the compressor is unloaded; and a shut-off valve to stop the flow of liquid when the compressor is loaded and the cooling and heat pumping system is operated to provide heating or cooling.

14. A motive drive system for a heating and cooling apparatus having a vapor compressor which comprises compressor parts including a compression chamber and a movable compression member, and an electric generator, comprising:

an internal combustion engine power source in rotating driving connection to the vapor compressor and in rotating driving connection to the electric generator, and providing motive power for the system; and means for unloading the vapor compressor during power generation to reduce the load imposed by the compressor upon the engine, the means for unloading including an unloading valve disposed upstream from the compression chamber, and operably between at least a first position wherein vapor flows freely therethrough into the compression chamber, and a second position wherein vapor flow to the compression chamber is blocked to unload the compressor, the means for unloading further including means for supplying back pressure to the compression member, for facilitating operation of the compression member; and means for producing a substantially constant frequency output from the generator;

wherein the engine operates when the compressor is unloaded to provide substantially constant electrical frequency output of the generator.

15. The system of claim 14 wherein the compressor is operatively connected to a cooling and heat pumping subsystem having a liquid line wherein the vapor may be condensed, and further comprising:

a liquid injection line connected at its first end to the liquid line and at its second end to a point downstream of the unloading valve, and a means for metering liquid through the liquid injection line to provide cooling to the compressor when the compressor is unloaded; and a shut-off valve to stop the flow of liquid when the compressor is loaded and the cooling and heat pumping system is operated to provide heating or cooling.

16. A method for heating and cooling living spaces and providing at least intermittent electrical co-generation, wherein a combustion engine driven heat pump system includes both a vapor compressor, having a compression chamber and a movable compression member, and an electrical generator in constant rotating driving connection with the combustion engine, comprising the steps of, alternately:

operating the heat pump system to provide cooling in living spaces; and operating the generator to produce substantially constant electrical frequency power output during periods when the heat pump system is not needed for heating and cooling, by performing the steps of:

blocking the flow of vapor through the heat pump system to the compressor compression chamber, and thereby unloading the compressor and reducing the demand on the engine;

supplying back pressure to the compression member, for facilitating operation of the compression member;

operating the engine at least at one substantially constant rotative speed;

producing substantially constant electrical frequency power output with said generator.

17. The method of claim 16 wherein:

the step of operating the generator includes the step of modifying the frequency of the power output of the generator and producing a more precise, controlled power output; and the step of operating the generator and modifying the frequency of the power output is performed continuously.

* * * * *